(12) United States Patent
Diot et al.

(10) Patent No.: US 12,236,273 B2
(45) Date of Patent: *Feb. 25, 2025

(54) CLUSTERING PROCESSES USING TRAFFIC DATA

(71) Applicant: Google LLC, Mountain View, CA (US)

(72) Inventors: Christophe Diot, Palo Alto, CA (US); Muhammad Jehangir Amjad, Redwood, CA (US); Weiwu Pang, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,030

(22) Filed: Mar. 29, 2023

(65) Prior Publication Data

US 2023/0244548 A1 Aug. 3, 2023

Related U.S. Application Data

(63) Continuation of application No. 16/994,085, filed on Aug. 14, 2020, now Pat. No. 11,663,053.

(51) Int. Cl.
*G06F 9/50* (2006.01)
*G06F 7/14* (2006.01)
*G06F 9/455* (2018.01)

(52) U.S. Cl.
CPC .............. *G06F 9/5033* (2013.01); *G06F 7/14* (2013.01); *G06F 9/45558* (2013.01);
(Continued)

(58) Field of Classification Search
CPC ...... G06F 9/5083; G06F 9/45558; G06F 7/14; G06F 2009/4557; G06F 2009/45595; G06F 9/5033
See application file for complete search history.

(56) References Cited

U.S. PATENT DOCUMENTS 9,009,719 B2  4/2015  Ramteke et al.
9,948,671 B2  4/2018  Perdisci et al.
(Continued)

FOREIGN PATENT DOCUMENTS

CN  105843781 A  8/2016

OTHER PUBLICATIONS

He et al. HaaS : Cloud-based Real-time Data Analytics with Heterogeneity-aware Scheduling. Jul. 2, 2018. 2018 IEEE 38th International Conference on Distributed Computing Systems (ICDCS). pp. 1017-1028. DOI: 10.1109/ICDCS.2018.00102.
(Continued)

*Primary Examiner* — Jacob D Dascomb
(74) *Attorney, Agent, or Firm* — Lerner David LLP

(57) ABSTRACT

Disclosure is made of methods, apparatus and system for clustering processes for use by a cloud platform. Process clustering may include receiving traffic data transmitted and received between each pair of processes in a set of processes. A matrix may be generated based on the traffic data, the matrix including a row and a column for each process in the set of processes. The matrix may be hierarchically clustered based on the traffic data, the hierarchical clustering outputting a plurality of clusters, each cluster including one or more processes in the set of processes. The plurality of clusters may then be merged into a set of merged clusters of processes.

18 Claims, 5 Drawing Sheets

(52) U.S. Cl.
CPC .... *G06F 9/5083* (2013.01); *G06F 2009/4557* (2013.01); *G06F 2009/45595* (2013.01)

(56) References Cited

U.S. PATENT DOCUMENTS

| | | | |
|---|---|---|---|
| 10,572,329 | B2 | 2/2020 | Harutyunyan et al. |
| 10,999,159 | B2* | 5/2021 | Enguehard ............... H04L 43/08 |
| 11,361,219 | B1* | 6/2022 | Bhattacharyya ........ G06V 40/15 |
| 2008/0059143 | A1* | 3/2008 | Chiu ........................ G06F 30/20 |
| | | | 703/14 |
| 2011/0225277 | A1 | 9/2011 | Freimuth et al. |
| 2015/0007173 | A1* | 1/2015 | Ionescu ............... G06F 9/45533 |
| | | | 718/1 |
| 2016/0248644 | A1* | 8/2016 | Dontcheva ............ G06T 11/206 |
| 2016/0359680 | A1 | 12/2016 | Parandehgheibi et al. |
| 2016/0359917 | A1 | 12/2016 | Rao et al. |
| 2018/0165142 | A1 | 6/2018 | Harutyunyan et al. |
| 2020/0026810 | A1 | 1/2020 | Subramaniam et al. |
| 2020/0082013 | A1 | 3/2020 | Triplet et al. |

OTHER PUBLICATIONS

International Search Report and Written Opinion for International Application No. PCT/US2020/064863 dated Apr. 16, 2021. 16 pages.

Yapicioglu et al. A Traffic-Aware Virtual Machine Placement Method for Cloud Data Centers. 2013 IEEE/ACM 6th International Conference on Utility and Cloud Computing, IEEE, Dec. 9, 2013 (Dec. 9, 2013), pp. 299-301, DOI: 10.1109/UCC.2013.62.

Yin et al. Optimizing Deployment of VMs in Cloud Computing Environment. Proceedings of 2013 3rd International Conference on Computer Science and Network Technology, IEEE, Oct. 12, 2013 (Oct. 12, 2013), pp. 703-706, DOI: 10.1109/ICCSNT.2013.6967208.

Office Action for European Patent Application No. 20838835.5 dated Dec. 6, 2022. 8 pages.

Extended European Search Report for European Patent Application No. 23209254.4 dated Mar. 18, 2024. 11 pages.

Office Action for Chinese Patent Application No. 202080011251.3 dated Dec. 16, 2024. 7 pages.

* cited by examiner

300

CLUSTERING PROCESSES USING TRAFFIC DATA

CROSS-REFERENCE TO RELATED APPLICATION

The present application is a continuation of U.S. patent application Ser. No. 16/994,085, filed on Aug. 14, 2020, the disclosure of which are incorporated herein by reference.

BACKGROUND

Cloud computing involves delivery of on-demand computing services over a network, e.g., a wide area network (WAN) such as for example the Internet and/or one or more local area networks (LANs). It provides information technology infrastructure as a group or groups of networked elements. Such network elements generally provide computing power and data storage to remotely located users via a network and are typically housed in data centers. Machine virtualization is commonly used in cloud computing. A typical virtualized computing system comprises multiple computing nodes that are interconnected by a high-speed network. The computing nodes run Virtual Machines (VMs) that consume physical resources such as Central Processing Unit (CPU), memory, persistent storage and networking resources. Physical resources may reside on one or more network elements, also referred to as hosts.

Cloud platforms provide publishers of cloud based services, such as websites and web applications, with the computing resources to deliver cloud based services. In this regard, cloud platforms maintain the information technology infrastructure needed to deliver cloud based services, such computing nodes running virtual machines or other processes. The cloud platforms rent or sell access to their respective information technology infrastructures to publishers, allowing publishers to provide their cloud based service using the cloud platforms information technology infrastructure, including computing nodes running VMs or other processes. The amount of resources rented or purchased by the publisher can be dynamically adjusted. For instance, during periods of high usage of a publisher's cloud based service, additional virtual machines or other processes may be rented from the cloud platform's information technology infrastructure. Similarly, during periods of lower usage of a publisher's application, fewer resources from the cloud platform's information technology infrastructure may be purchase or rented. Through cloud platforms, publishers have access to whatever computing resources they need, without having to maintain and invest in their own information technology infrastructures.

BRIEF SUMMARY

Aspects of this disclosure provide techniques, apparatus and systems directed to clustering processes. As an example, the techniques comprise clustering VMs and other such processes based on their traffic patterns.

One aspect of the disclosure is directed to a method for clustering processes, comprising: receiving, by one or more processors, traffic data transmitted and received between each pair of processes in a set of processes; generating, by the one or more processors, a matrix based on the traffic data, the matrix including a row and a column for each process in the set of processes; hierarchically clustering, by the one or more processors, the matrix based on the traffic data, the hierarchical clustering outputting a plurality of clusters, each cluster including one or more processes in the set of processes; and merging, by the one or more processors, the plurality of clusters into a set of merged clusters of processes.

Another aspect of the disclosure is directed to a system including one or more computing devices; one or more computer readable storage media; and program instructions, stored on the one or more computer readable storage media, for execution by at least one of the one or more computing devices. The program instructions may cause the one or more computing devices to: receive traffic data transmitted and received between each pair of processes in a set of processes; generate a matrix based on the traffic data, the matrix including a row and a column for each process in the set of processes; hierarchically cluster the matrix based on the traffic data, the hierarchical clustering outputting a plurality of clusters, each cluster including one or more processes in the set of processes; and merge the plurality of clusters into a set of merged clusters of processes.

Another aspect of the disclosure is directed to a non-transitory computer readable medium containing program instructions. The instructions when executed by one or more computing devices, cause the one or more computing devices to perform the steps of: receiving traffic data transmitted and received between each pair of processes in a set of processes; generating a matrix based on the traffic data, the matrix including a row and a column for each process in the set of processes; hierarchically clustering the matrix based on the traffic data, the hierarchical clustering outputting a plurality of clusters, each cluster including one or more processes in the set of processes; and merging the plurality of clusters into a set of merged clusters of processes.

In some examples, the set of merged clusters of processes may be implemented on a cloud platform.

In some examples each entry in the matrix includes the traffic data transmitted by a process corresponding to the row of the entry and received by a process corresponding to the column of the entry.

In some example, the matrix is a multi-dimensional matrix comprising a matrix for each traffic data type concatenated together, the multi-dimensional matrix having dimensions N×(XN), wherein N is a number of processes in the set of processes and X is a number of matrices concatenated together.

In some instances, hierarchically clustering the matrix includes hierarchically linking each process or the clusters of processes together. Hierarchical linking may include Ward linkage, the Ward linkage outputting a dendrogram representing each process in the set of processes as leaf nodes and each of the clusters of processes as non-leaf nodes. In some instances, merging the plurality of clusters includes cutting the dendrogram at merging points.

In some examples, the set of merged clusters of processes may be clustered.

DETAILED DESCRIPTION

Overview

The technology relates to clustering processes, such as VMs, based on the traffic patterns of the individual processes to optimize the performance and availability of the processes in the clusters. For example, VMs implemented for a cloud service, such as an online application, are typically configured by a network architect or other such administrator of the publisher of the cloud service. In many instances, the publisher clusters VMs together to provide sufficient computing power and/or redundancy for a particular feature or features for the cloud service. However, the performance of the clusters and the VMs in the clusters is not easily predicted, and often, the clusters and the VMs in the clusters do not operate in an efficient manner. For instance, the workloads experienced by VMs in one cluster may be greater than VMs in another cluster that are serving a similar function for the cloud service. This uneven spread of workload between the clusters and VMs in the clusters may reduce the performance and availability of the cloud service. Similar issues arise for other processes such as containers and/or jobs within a containerized environment.

To address these issues, the grouping of processes into functional clusters, where the processes in a cluster perform similar functions, may be optimized based on operational data of the processes. In this regard, the traffic between each process may be input into a matrix. Each entry in the matrix may be scaled to normalize the traffic volume between each process. The matrix may be truncated to reduce its dimensionality, simplifying and reducing the processing requirements for the further computations described herein. Unsupervised machine learning may be used to conduct hierarchical clustering on the truncated matrix such that processes having similar entries are clustered together. Hierarchical clustering may include hierarchical linking to combine similar clusters together to create a dendrogram. The dendrogram may represent each process as a leaf and merged clusters of processes may be represented by the merging points, also called non-leaf nodes. The dendrogram may be cut at merging points to form flat clusters. In some instances, additional clustering may be performed to further merge similar clusters together. The resulting clusters of processes may be implemented in the information technology infrastructure of the cloud platform for use by the cloud service.

Example Systems

Figure 1:
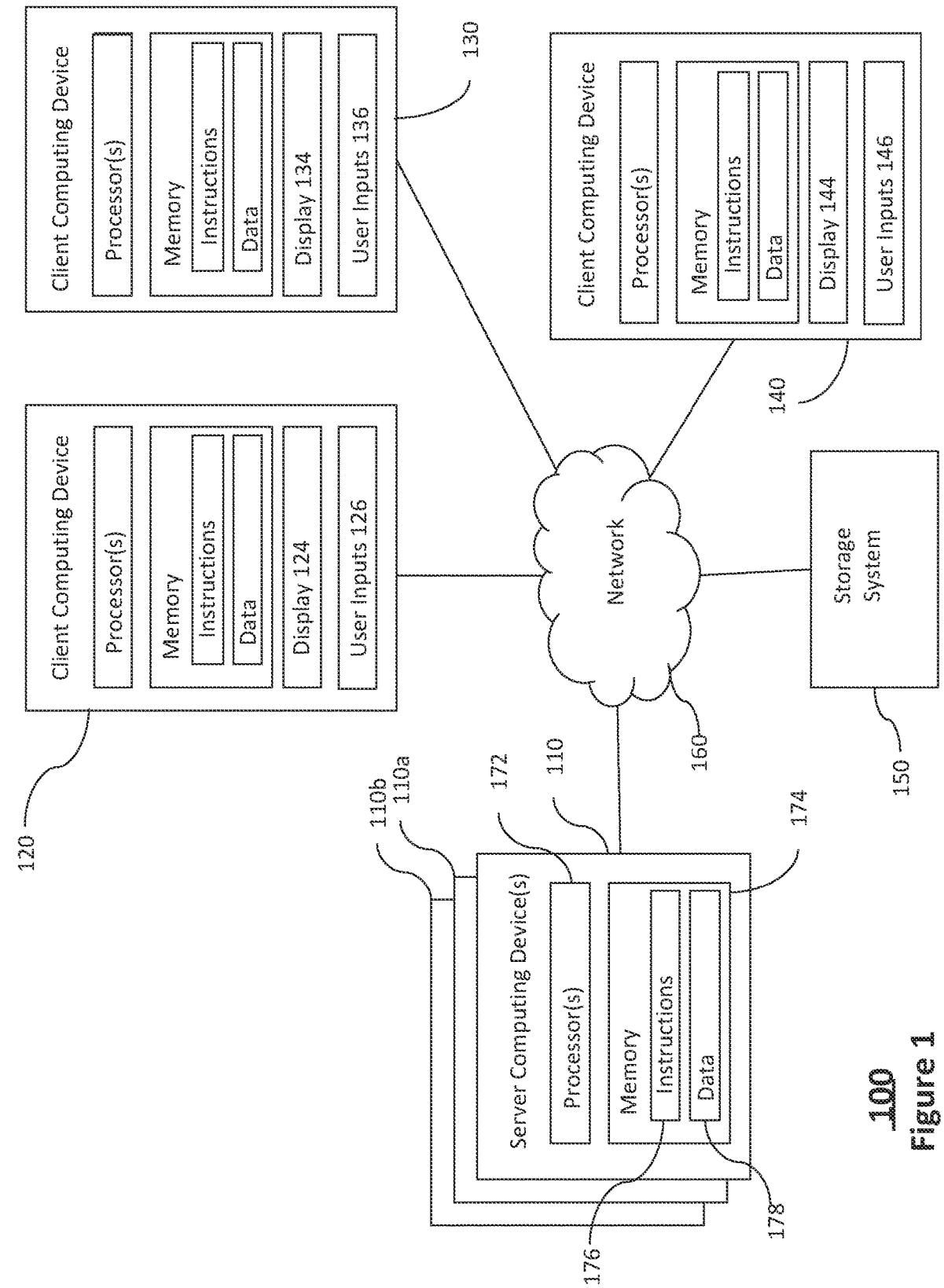
FIG. 1 is a functional diagram of an example system in accordance with aspects of the disclosure.

FIG. 1 shows an example system 100 that includes a plurality of computing devices, including server computing devices 110, 110a, 110b, and client computing devices 120, 130, and 140, as well as a storage system 150. The computing devices and storage system 150 are connected via a network 160.

As shown in FIG. 1, each of computing devices 110-140 may include one or more processors, memory, data and instructions. For example, server computing device 110 includes one or more processors 172, memory 174, instructions 176 and data 178. Although only the components of a single server computing device are shown, any number of server computing devices having the same or different components than server computing device 110 may be included in the system 100. For instance, server computing device 110a and 110b may have the same or different components than server computing device 110. Moreover, the system may include any number of server computing devices.

The memory 174 stores information accessible by the one or more processors 172, including instructions 176 and data 178 that may be read, written, manipulated, executed or otherwise used by the processor(s) 172. The memory 174 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 176 may be any set of instructions to be executed directly (such as machine code) or indirectly (such as scripts) by the processor 172. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Processes, functions, methods and routines of the instructions are explained in more detail below.

The data 178 may be retrieved, stored or modified by processor 172 in accordance with the instructions 176. As an example, data 178 associated with memory 174 may comprise data used in supporting services for one or more client devices, e.g., 120, 130 or more. Such data may include data to support cloud services, virtualization, virtual machines, containers, jobs, containerization environments, hosting web-based applications, file share services, communication services, gaming, sharing video or audio files, or any other networked based services.

The one or more processors 172 may be any conventional processor, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be located or stored within the same physical housing. In one example, server computing device 110 may include one or more server computing devices having a plurality of computing devices, e.g., a load balanced server farm, that exchange information with different nodes of a network for the purpose of receiving, processing and transmitting the data to and from other computing devices.

Server computing device 110 may function as a server providing virtualization services, containerization environments, or other such processes, including supporting one or more virtual machines or containers. Server computing device 110 also represents a cloud computing environment housing multiple computing devices that functions as host devices capable of providing or managing virtual machines or containerization environments.

The network 160, and intervening nodes, may include various configurations and protocols including short range communication protocols such as Bluetooth™ Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as wired and/or wireless network interfaces.

As shown in FIG. 1, each client computing device 120, 130, 140 may be a personal computing device intended for use by a user and have all of the components normally used in connection with a personal computing device including a one or more processors (e.g., a central processing unit (CPU)), memory (e.g., RAM and internal hard drives) storing data and instructions, a display such as displays 124, 134, 144 (e.g., a monitor having a screen, a touch-screen, a projector, a television, or other device that is operable to display information), speakers, and user input devices 126, 136, 146 (e.g., a mouse, keyboard, touchscreen or microphone). The client computing devices may also include a camera for recording video streams, speakers, a network interface device, and all of the components used for connecting these elements to one another. Although only three client computing devices are shown in FIG. 1, the system 100 may actually include any number of such devices.

Client computing device 140 may also be a workstation associated with the network devices, e.g., one or more server computing devices 110, and used for administration and/or maintenance, including functioning as a backed system. In this regard, client computing device 140 may be operated by a network administrator who supports, maintains and manages the services provided by server computing device 110. With regard to maintenance, the client computing device 140 may enable the network administrator to access information about the servers such as the current version of software running on the server and installing updates, patches, etc. It may also function to access information about storage systems 150, such as disk size, rewrite rate, etc. Again, although only a single backend client device, 140, is depicted in FIG. 1, the system may actually have any number of such devices.

Although the client computing devices 120-140 may each comprise a full-sized personal computing device, they may alternatively comprise mobile computing devices capable of wirelessly exchanging data with a server computing device (such as the server computing devices 110) over a network such as the Internet. By way of example only, client computing device 120 may be a mobile phone or a device such as a wireless-enabled PDA, a tablet PC, a wearable computing device or system, or a netbook that is capable of obtaining information via the Internet or other networks. In another example, client computing device 130 may be a wearable computing system, such as a smartwatch. As an example the user may input information using a small keyboard, a keypad, microphone, using visual signals with a camera, or a touch screen.

As with memory 174, storage system 150 can be of any type of computerized storage capable of storing information accessible by the server computing devices 110, such as a hard-drive, disk, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown, and/or may be directly connected to or incorporated into any of the computing devices 110-140, etc. Storage system 150 may store various types of information as described in more detail below. This information may be retrieved or otherwise accessed by one or more server computing devices, such as the server device 110, and/or one or more client computing device, such as the client computing device 120, in order to perform some or all of the features described herein.

Figure 2:
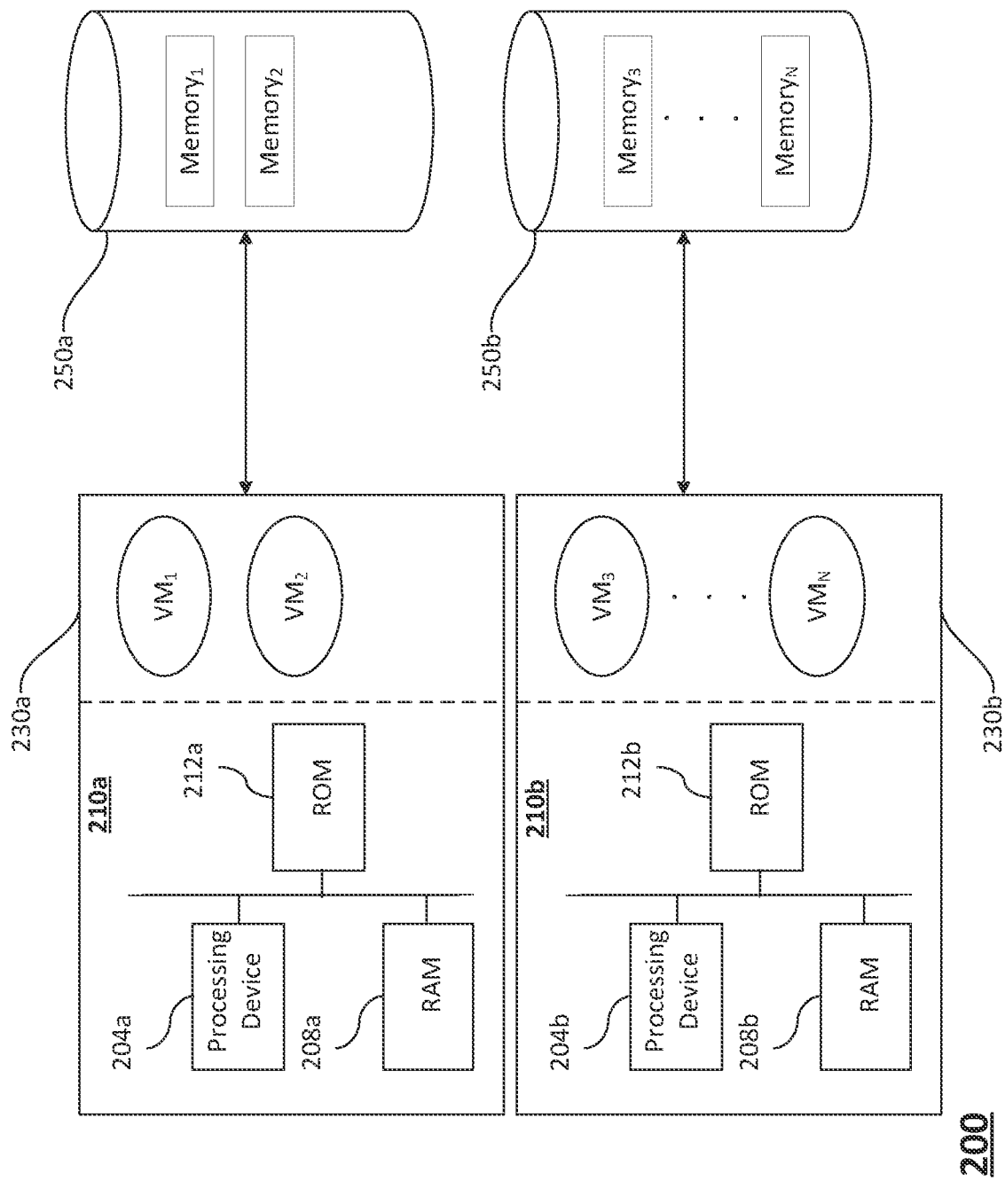
FIG. 2 illustrates an example system in accordance with aspects of the disclosure.

FIG. 2 is a functional block diagram of a system 200 in in accordance with aspects of the disclosure. The system 200 includes hosts 210a and 210b that are configurable to operate one or more virtual machines or containerization environments. For instance, host 210a runs virtual machines 230a, including $VM_1$ and $VM_2$ and host 210b run virtual machines 230b, including $VM_3$ and $VM_4$. VMs comprise essentially a computer that does not run on its own dedicated hardware, but is rather hosted on some hardware that may be running multiple VMs. Although host 210a is shown as executing VMs 230a including $VM_1$ and $VM_2$, and host 210b is shown as hosting VMs 230b including $VM_3$ through $VM_4$, each host may run any number of virtual machines. Additionally, the system may include any number of hosts.

Each host includes one or more processing devices, volatile memory, and non-volatile memory. For example, host 210a includes processing device 204a, volatile memory 208a, and non-volatile memory 212a. Similarly, host 210b includes processing device 204b, volatile memory 208b, and non-volatile memory 212b. Each of the one or more hosts 210a, 210b may be operable to run programming instructions storable in the memories. Hosts 210a may comprise a server, such as server 110 and host 210b may comprise a server, such as server 110a.

Each host, 210a, 210b, may be in communication with a disk. As shown in FIG. 2, host 210a is in communication with disk 250a and host 210b is in communication with disk 250b. Although the hosts 210a and 210b are shown as being separate, the disks may be a single unit. Moreover, each host may be connected to multiple disks. Each disk 250a, 250b is a storage device that is partitionable to provide physical or virtual storage used by VMs 230a, 230b to provide computing services. In this regard, host 210a may include partitioned memory—$Memory_1$, $Memory_2$—corresponding to VMs 230a and host 210b may include partitioned memory—$Memory_3$, $Memory_N$—corresponding to VMs 230b. Each partition may correspond to a single VM or a group of VMs.

Example Methods

Figure 3:
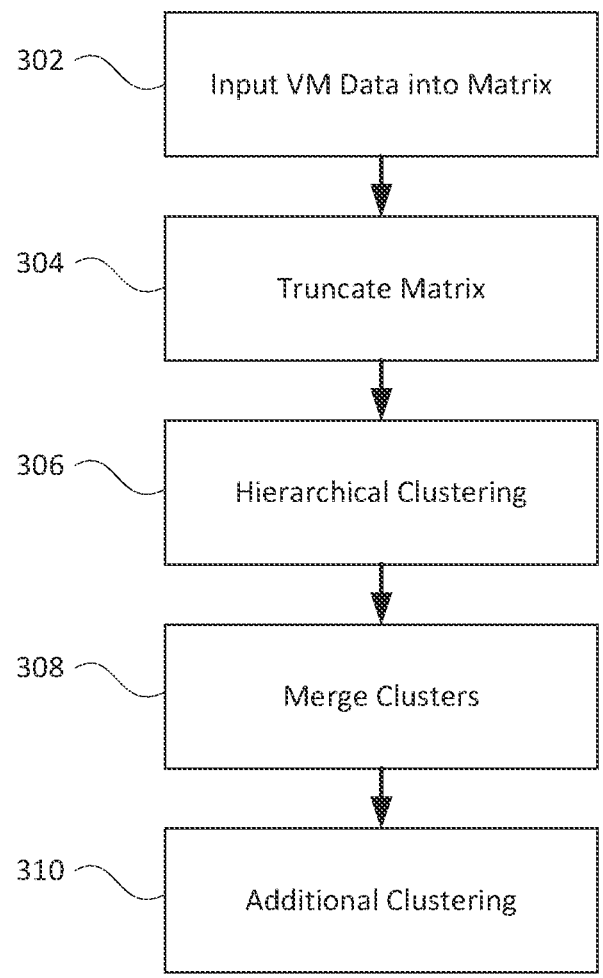
FIG. 3 is a flow diagram illustrating clustering of virtual machines in accordance with aspects of the disclosure.

FIG. 3 is a flow diagram 300 showing a method for optimizing VM clusters. As shown in the flow diagram 300, the method includes inputting VM data into one or more matrices at block 302, truncating the matrix at block 304, hierarchical clustering at block 306, merging clusters at block 308, and additional clustering at block 310. The process may also include implementing the resulting cluster of virtual machines in the information technology infrastructure of the cloud platform for use by the cloud service. Although the examples described herein refer to virtual machine clustering, the processes and systems described herein may also be applied to other processes. For example, the steps performed for optimizing virtual machine clusters may be used to optimize job allocations in containerized environments.

The VMs to be clustered may be VMs for executing a publisher's cloud service operating on a cloud platform. The cloud platform may execute the VMs, such as $VM_1$ and $VM_2$ on host 210a and $VM_3$ and $VM_4$ on host 210b. The number of virtual machines executed by the hosts may be predefined, variable based on the computing resource requirements of the cloud service, and/or defined by the cloud platform or the publisher of the cloud service.

The operational data that is produced, transmitted, and/or received by the VMs that implement the cloud service may include confidential and/or proprietary information of the publisher or users of the publisher's cloud service. Such data is referred to herein as "private data," and may also be known as personally identifiable information. To maintain the confidentiality of such private data, the operational data relied on to optimize the VM clusters, as described herein, may be information that does not include any such private data. For example, the operational data may include the traffic data between each of the VMs implementing the cloud service. The traffic data may include one or more values indicative of the amount of traffic transmitted between the VMs, such as the number of packets, bits, bytes, or other such metrics transmitted between the VMs. In instances where other processes are being allocated, the traffic data may include one or more values indicative of the amount of traffic transmitted between each process. For instance, traffic data may include values indicative of the amount of traffic transmitted between jobs, containers, and/or container environments As shown in block 302, the operational data associated with the VMs may be input into one or more matrices. For example, traffic data may be provided to a client computing device, such as client computing device 140 from the host or hosts on which VMs are executing. Alternatively, the traffic data may be logged by the hosts and stored in a central location, such as storage system 150 or internal memory in the hosts, from where the client computing device 140 may pull the data or request it be forwarded. Although the aforementioned embodiment describes the traffic data being provided to a client computing device for performing the methods described herein, the methods may be performed by the host(s) and/or other server computing devices, such as server computing device 110.

Figure 4:
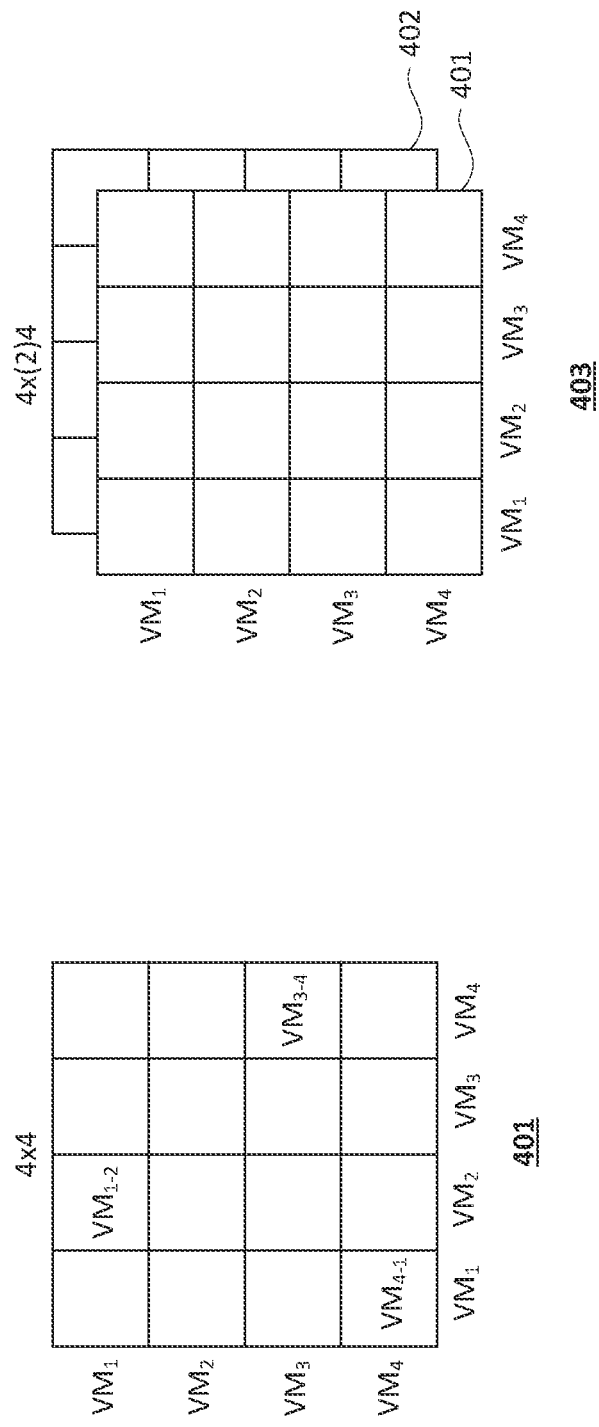
FIG. 4 illustrates example matrices in accordance with aspects of the disclosure.

FIG. 4 illustrates an example matrix 401 formed by inputting data for a set of VMs, $VM_1$ and $VM_2$, $VM_3$ and $VM_4$ implementing the cloud service. The size of the matrix is determined by the number of VMs undergoing cluster optimization. For instance, if "N" VMs are undergoing cluster optimization, the size of the matrix may be N×N. The size of the matrix 401 is 4×4, as four VMs—$VM_1$ and $VM_2$, $VM_3$ and $VM_4$—are being optimized. Although 4 VMs, corresponding to the number of VMs implementing the cloud service are shown in matrix 401, the matrix may be less than the total number of VMs implementing a cloud service. For instance, only a portion of the VMs implementing a cloud service may be selected for cluster optimization according to the techniques described herein.

The rows of the matrix may represent the traffic volume from a VM and each column may represent the traffic volume received by a VM. For instance, entry $VM_{1-2}$ represents the traffic volume from $VM_1$ to $VM_2$ and received by $VM_2$ from $VM_1$. Likewise, entry $VM_{3-4}$ represents the traffic data from $VM_3$ to $VM_4$ and received by $VM_4$ from $VM_3$ and entry $VM_{N-1}$ represents the traffic data from $VM_4$ to $VM_1$ and received by $VM_1$ from $VM_4$. For clarity, only a few entries are shown in matrix 401, although entries may be included for each pair of VMs.

In some instances, multiple types of traffic data may be used in cluster optimization. In this regard, each data type may be put into its own matrix. For example, matrix 401 may include traffic data comprising bytes and another 4×4 matrix 402 may include the number of packets transmitted between VM pairs. The matrices may be concatenated together to form a multi-dimensional N×(2)N matrix 403. Although FIG. 4 illustrates a matrix having (2)N dimensions, additional dimensions may be added for each additional type of traffic data and/or other operational data. For instance, for four types of traffic data, a N×(4)N dimension matrix may be formed.

The entries in the matrix, including each entry in any concatenated matrices, may be scaled to make the entries comparable to each other. For instance, $VM_1$ may handle a larger volume of processing than $VM_2$, but each VM—$VM_1$ and $VM_2$—may process the same types of functions for the cloud service. To provide an accurate comparison between the two VMs, the operation data in each entry may be normalized. For example, a quantile transformation may be used to re-map the feature vectors to a standard uniform distribution effectively transforming the range of values to a consistent and known range, such as [0, 1] or some other such range.

The matrix 401 may be truncated to reduce the number of dimensions of the matrix, as shown in block 304 of FIG. 3. For example, single value decomposition truncation (TruncatedSVD), or some other truncation method such as principal component analysis (PCA), may be used to reduce the number of dimensions in the matrix 401. The dimension reduction process may treat each row of the feature matrix as a sample point and each column as a feature. This helps truncate (or remove) the least significant directions in the column (feature) space of this matrix. For matrices having large numbers of virtual machines, such as thousands, the dimensions may reduce to only a few hundred, or less. In addition to retaining the most significant directions in the column (feature) space, this truncation of the matrix reduces the amount of computation required to perform the additional method steps described herein.

Hierarchical clustering may be performed on the truncated matrix, as shown in block 306 of FIG. 3. Hierarchical clustering recursively merges similar singletons or clusters together until there is only one cluster. A singleton may be considered a single VM and a cluster may be two or more VMs. In one example, Ward linkage may be used to determine which singletons and clusters to merge together at each iteration. In this regard, pairs of clusters and/or singletons that have the lowest variation may be merged together.

Figure 5:
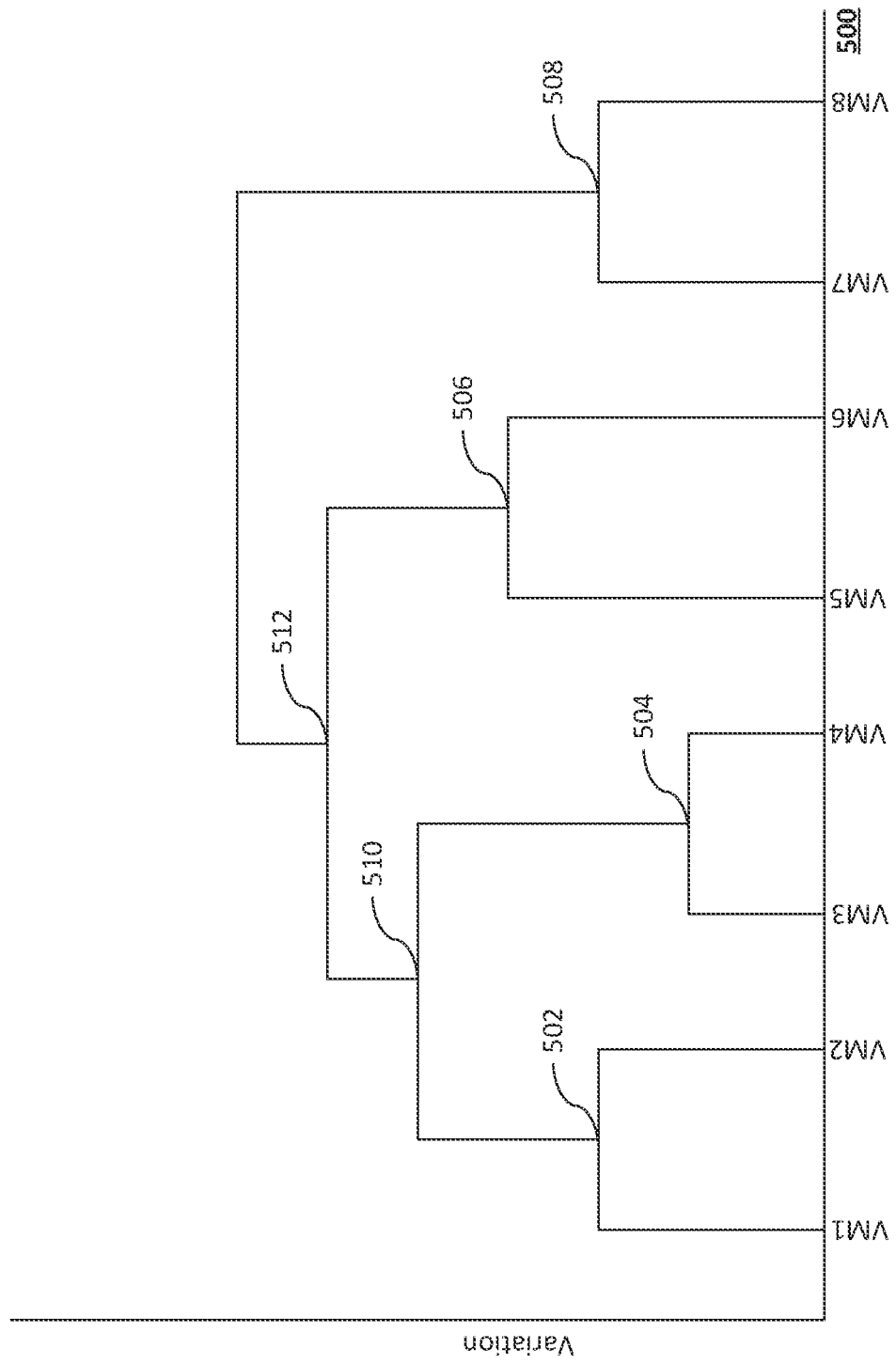
FIG. 5 illustrates an example dendrogram in accordance with aspects of the disclosure.

At the conclusion of the hierarchical clustering, a dendrogram may be produced. FIG. 5 illustrates an example dendrogram 500 including leaf nodes and non-leaf nodes. The leaf nodes—VM1-VM8—represent the VMs and the non-leaf nodes —502-512—represent merging points of the clusters formed during the linkage described above with regard to block 306.

The algorithm may 'cut' the dendrogram, by merging clusters to form clusters, as shown in block 308 of FIG. 3. To decide where to "cut" the dendrogram, an inconsistency metric may be used. For example, for a given non-leaf node in the dendrogram with height h, if its subtree contains nodes with heights H={h0, h1, ... }, and mean of the heights is H, and the standard deviation is $\sigma(H)$, the inconsistency (inc) of the node is: inc=(h−H)/$\sigma(H)$. When deciding whether to merge two sub-trees (or nested clusters), the inconsistency metric quantifies how different the new merged cluster would be compared to the nested clusters within it. A low value means that the merged cluster would be similar to the nested clusters under it. Conversely, a high inconsistency means that the merged cluster contains nested clusters which are fairly different. This ends up producing a distribution of inconsistency metric values. In this regard, the "knee point" of the cumulative distribution function of the inconsistency distribution may be used as the cutting threshold. Specifically, the "knee" helps identify (approximately) the point at which the distribution is plateauing which helps determine an appropriate cut-off for the inconsistency threshold. Cutting the dendrogram in this way produces clusters with consistent traffic patterns inside each cluster.

In some instances, another round of clustering may be performed, as shown in block 310, to merge several clusters that are similar. The additional merging may be performed by calculating the centroid, also called the feature means, of each cluster. The similarity between each centroid may be determined and a threshold value may be used to determine whether two centroids are considered similar enough to merge. For instance, if the similarity is below the threshold value, the clusters may be merged. The resulting clusters of VMs may be implemented in the information technology infrastructure of the cloud platform for use by the cloud service.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Unless otherwise stated, the foregoing alternative systems, methods and examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for clustering processes, comprising:
   receiving, by one or more processors, traffic data transmitted and received between each pair of processes in a set of processes, wherein each process in the set of processes is implemented on a cloud platform and the set of processes includes two or more processes;
   generating, by the one or more processors, a multi-dimensional matrix based on the traffic data, the multi-dimensional matrix having a number of matrices concatenated together, wherein the number of matrices concatenated together includes a matrix for each traffic data type, and each matrix of the number of matrices concatenated together has a row and a column for each process in the set of processes;
   truncating, by the one or more processors, the multi-dimensional matrix to reduce a number of dimensions of the matrix;
   clustering, by the one or more processors, the multi-dimensional matrix based on the traffic data, the clustering outputting a plurality of clusters, each cluster including one or more processes in the set of processes;
   merging, by the one or more processors, the plurality of clusters into a set of merged clusters of processes; and
   implementing, by the one or more processors, the set of merged clusters of processes on the cloud platform.

2. The method of claim 1, wherein each cell in the matrix includes the traffic data transmitted by a process corresponding to the row of the cell and received by a process corresponding to the column of the cell.

3. The method of claim 2, wherein the traffic data includes one or more of a number of packets, bits, or bytes transmitted between each pair of processes in the set of processes, and wherein the traffic data does not include personally identifiable information.

4. The method of claim 1, wherein the truncating includes single value decomposition truncation or principal component analysis.

5. The method of claim 1, further comprising normalizing the traffic data such that each piece of the traffic data has a value within a standard uniform distribution.

6. The method of claim 1, wherein clustering the multi-dimensional matrix includes hierarchically linking each process or the clusters of processes together.

7. The method of claim 6, wherein the hierarchical linking includes Ward linkage, the Ward linkage outputting a dendrogram representing each process in the set of processes as leaf nodes and each of the clusters of processes as non-leaf nodes.

8. The method of claim 7, wherein merging the plurality of clusters includes cutting the dendrogram at merging points.

9. The method of claim 1 further comprising clustering the set of merged clusters of processes.

10. A computing system for clustering processes, comprising:
    one or more computing devices;
    one or more computer readable storage media, storing instructions, which, when executed by the one or more computing devices, cause the one or more computing devices to:
    receive traffic data transmitted and received between each pair of processes in a set of processes, wherein each process in the set of processes is implemented on a cloud platform and the set of processes includes two or more processes;
    generate a multi-dimensional matrix based on the traffic data, the multi-dimensional matrix having a number of matrices concatenated together, wherein the number of matrices concatenated together includes a matrix for each traffic data type, and each matrix of the number of matrices concatenated together has a row and a column for each process in the set of processes;
    truncate the multi-dimensional matrix to reduce a number of dimensions of the matrix;
    cluster the multi-dimensional matrix based on the traffic data, the clustering outputting a plurality of clusters, each cluster including one or more processes in the set of processes;
    merge the plurality of clusters into a set of merged clusters of processes; and
    implement the set of merged clusters of processes on the cloud platform.

11. The system of claim 10, wherein each cell in the matrix includes the traffic data transmitted by a process corresponding to the row of the cell and received by a process corresponding to the column of the cell.

12. The system of claim 11, wherein the traffic data includes one or more of a number of packets, bits, or bytes transmitted between each pair of processes in the set of processes, and wherein the traffic data does not include personally identifiable information.

13. The system of claim 10, wherein the truncating includes single value decomposition truncation or principal component analysis.

14. The system of claim 10, wherein the instructions further cause the one or more computing devices to:
  normalize the traffic data such that each piece of the traffic data has a value within a standard uniform distribution.

15. The system of claim 10, wherein clustering the multi-dimensional matrix includes hierarchically linking each process or the clusters of processes together.

16. The system of claim 15, wherein the hierarchical linking includes Ward linkage, the Ward linkage outputting a dendrogram representing each process in the set of processes as leaf nodes and each of the clusters of processes as non-leaf nodes.

17. The system of claim 16, wherein merging the plurality of clusters includes cutting the dendrogram at merging points.

18. The system of claim 10, wherein the instructions further cause the one or more computing devices to cluster the set of merged clusters of processes.

\* \* \* \* \*